US012577916B2

(12) United States Patent
Sun et al.

(10) Patent No.: US 12,577,916 B2
(45) Date of Patent: Mar. 17, 2026

(54) AERO-ENGINE SURGE ACTIVE CONTROL SYSTEM BASED ON FUZZY CONTROLLER SWITCHING

(71) Applicant: DALIAN UNIVERSITY OF TECHNOLOGY, Dalian (CN)

(72) Inventors: Ximing Sun, Dalian (CN); Fuxiang Quan, Dalian (CN); Chongyi Sun, Dalian (CN); Yanhua Ma, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 585 days.

(21) Appl. No.: 18/032,898

(22) PCT Filed: Jun. 4, 2021

(86) PCT No.: PCT/CN2021/098278
§ 371 (c)(1),
(2) Date: Apr. 20, 2023

(87) PCT Pub. No.: WO2022/252206
PCT Pub. Date: Dec. 8, 2022

(65) Prior Publication Data
US 2023/0392556 A1 Dec. 7, 2023

(51) Int. Cl.
*F02C 9/16* (2006.01)
*F04D 27/02* (2006.01)
*G06N 7/02* (2006.01)

(52) U.S. Cl.
CPC ............... *F02C 9/16* (2013.01); *F04D 27/02* (2013.01); *G06N 7/02* (2013.01); *F05D 2270/707* (2013.01)

(58) Field of Classification Search
CPC .......... G06N 7/02; G06N 7/023; F04D 27/02; F04D 2270/707; F02C 9/16
See application file for complete search history.

(56) References Cited

U.S. PATENT DOCUMENTS 5,915,917 A * 6/1999 Eveker .................... F04D 27/02
                                                          415/17
6,438,960 B1 * 8/2002 Jaw ......................... F04D 27/02
                                                          60/726
(Continued)

FOREIGN PATENT DOCUMENTS

CN        106483850 A      3/2017
CN        108843613 A     11/2018
(Continued)

OTHER PUBLICATIONS

"Compressor surge control using a variable area throttle and fuzzy logic control", Al-Mawali and Jie Zhang (Transactions of the Institute of Measurement and Control 32, 4 (2010) pp. 347-375).*
"Active/Passive Hybrid control system for Compressor Surge Based on Fuzzy Logic" Hanlin Sheng et al. (Journal of Engineering for Gas Turbines and Power Sep. 2014, vol. 136).*
(Continued)

*Primary Examiner* — Vincent H Tran
(74) *Attorney, Agent, or Firm* — MUNCY, GEISSLER, OLDS & LOWE, P.C.

(57) ABSTRACT
An aero-engine surge active control system based on fuzzy controller switching is provided. The present invention selects a basic controller with the most appropriate current state for switching control according to the operating state of a compressor based on the principle of fuzzy switching, and can realize large-range, adaptive and performance-optimized surge active control. Controllers designed by the present invention realize large-range surge active control through fuzzy switching, so that the effective operating ranges of the controllers are expanded and the reliability of the controllers is improved. The designed controllers can be applied to the active control of surge caused by various causes, so that the adaptability of the controllers is improved and is closer to the actual operating condition of the engine. Some optimization indexes are added in the design process
(Continued)

of the controllers, which can realize optimal control under corresponding optimization objectives.

4 Claims, 8 Drawing Sheets

(56)                  References Cited

U.S. PATENT DOCUMENTS

2002/0129607 A1\*   9/2002  Prasad ...................... F02C 9/28
                                                     60/39.27
2008/0222056 A1\*   9/2008  Huang ............... G05B 13/0275
                                                     706/3

FOREIGN PATENT DOCUMENTS

CN          109184913 A     1/2019
CN          111737910 A     10/2020
CN          112560340 A     3/2021
WO        WO-0238963 A1    5/2002

OTHER PUBLICATIONS

Wu, Feng, "Research on Anti-surge Control of Compressor Based on Fuzzy PID Control," Mechanical and Electrical Information No. 36, Dec. 25, 2012, pp. 2 132-133, 2 pages.
Wang et al., "Application of Fuzzy PID Sliding Mode Controller in the Surge of Blower," Micro Processors No. 6, Dec. 2015, pp. 77-81, 5 pages.

\* cited by examiner

AERO-ENGINE SURGE ACTIVE CONTROL SYSTEM BASED ON FUZZY CONTROLLER SWITCHING

TECHNICAL FIELD

The present invention belongs to the field of aero-engine modeling and control, and relates to an aero-engine surge active control system based on fuzzy controller switching.

BACKGROUND

At present, high-performance aero-engines are developing towards high thrust-weight ratio, high speed and high reliability, which also puts forward higher requirements for aerodynamic stability of compressors. The increase of the thrust-weight ratio of the high-performance engines leads to the increase of the single-stage pressure ratio of the compressors and higher compressor load, so that the aerodynamic stability problem of the aero-engines is gradually prominent and becomes one of the important factors that limit the development of the engines.

In the traditional compressor surge control method, the core idea is to ensure sufficient surge margin at operating points when the operating points of the compressors are designed. In this way, the operating points of the compressors may generate slight disturbance, and can still be maintained in a stable operating space. This method has high reliability, but is often too conservative when the operating points are selected, and sacrifices the engine performance for engine stability. At this time, the superiority of the active surge control method is gradually reflected.

The active control method inhibits the generation and development of unstable states of the compressors such as surge by prestage air injection and adjustment of exhaust volume, so as to expand the stable operating range of the engines and make the operating points of the engines move to a position with high performance. At present, the active surge control methods can be divided into the following three categories: modal based control methods, nonlinear control methods and intelligent control methods. These methods can inhibit the occurrence of the unstable states of the compressors such as surge under certain conditions, but have lower reliability compared with the traditional control methods. If a controller fails, surge may be caused directly, which is one of the reasons that the active control method is not actually applied for a long time. Meanwhile, most of the current active control methods are only targeted at one unstable state or instability cause, and have no good adaptability. In addition, most of the active control methods are often designed only for local operating points, and cannot achieve large-range active surge control. At present, the existing active control methods are based on effective inhibition of the unstable states such as surge, do not consider the performance loss of the engines after the controller takes actions, and are not optimal control strategies under the same performance.

SUMMARY

In view of the problems of low reliability, inadequate adaptability and small operating range in the active control method in the prior art, the present invention provides an aero-engine surge active control system based on fuzzy controller switching.

The present invention adopts the following technical solution:

An aero-engine surge active control system based on fuzzy controller switching is provided. The control system mainly comprises three parts: a basic controller design module, a fuzzy switching module and a control signal fusion module. The design process of each part comprises the following steps:

S1 Designing $N_c$ basic controllers in combination with traditional Lyapunov stability theory according to stability requirements in surge active control, wherein the basic controllers are used for generating a basic control signal $u_{base}$ of a fuzzy switching controller designed by the present invention, and the above control signal is fused into an actual control signal $u_{out}$ of the controllers through fuzzy switching in subsequent steps. A specific implementation process is as follows:

S1.1 Designing $N_c$ basic controllers by a Lyapunov stability theory based modal control method, with $N_c$ not less than 2; in each basic controller, using a compressor average flow coefficient $\Phi$ and a disturbance first-order mode A as feedback quantities respectively to determine a relationship between the feedback quantities and a control quantity $u_c$ required by a compressor, i.e.:

$$u_{base,1} = k_1(\Phi - \Phi_0)$$

$$u_{base,2} = k_2 A$$

$$u_{base,N_c} = k_{N_c}(-\Phi + \Phi_0 + A)$$

in the formulas, $k_1$, $k_2$, . . . , $k_{N_c}$ are controller parameters to be determined; $u_{base,j}$ represents a basic control signal outputted by an jth basic controller, and $\Phi_0$ is the average flow coefficient of the compressor during steady-state operation;

A determining method of the controller parameter is as follows: conducting linearization based on a traditional compressor Moore-Greitzer model, to obtain the controller parameter in combination with the Lyapunov stability theory.

S1.2 Determining the operating ranges of the $N_c$ basic controllers: when the operating state of the compressor is within the operating ranges of the basic controllers, the basic controllers can ensure the stable operation of the compressor through tip jet, and the operating ranges of the basic controllers can be expressed by the size of the disturbance to the compressor. In addition, the designed basic controllers are required to have different operating ranges. For example, in the design process of the basic controllers, different compressor parameter variables (average flow $\Phi$ and first-order mode A) are selected as feedback variables of the basic controllers, and the basic controllers operated in the range of small disturbance and large disturbance are designed respectively.

S1.3 Sequencing the basic controllers according to the size of the disturbance range that can be used for operation, based on the operating ranges of the $N_c$ basic controllers, that is, with the increase of the disturbance to the compressor, the controllers in the operating ranges are converted in this order, wherein the rank of the ith basic controller is recorded as $rank_i$, and $rank_i$ is an integer from 1 to $N_c$.

S2 Designing the fuzzy switching module.

The fuzzy switching module obtains a selection trend x of the basic controllers by traditional fuzzy reasoning according to a state variable $c_{tre}$ of the compressor. The state variable x of the compressor refers to the physical quantity which can reflect the operating state of the compressor. These state variables comprise but are not limited to the compressor average flow and average pressure rise. The selection trend $c_{tre}$ of the basic controllers is a parameter within a range of 0-1, and is used for representing a weight of a basic controller.

The design of the fuzzy switching module needs to determine a state variable x of module input, fuzzy division of module input and output, fuzzy rules used in fuzzy reasoning, and a defuzzification method; a specific design process is as follows:

S2.1 Determining the state variable x (average flow $\Phi$ and the first-order mode A) which can represent the operating state of the compressor, as the input of the fuzzy switching module.

S2.2 Conducting fuzzy division for the state variable x of the input of the fuzzy switching module, and obtaining $N_a$ fuzzy sets in each variable division; conducting fuzzy division for the selection trend $c_{tre}$ of the outputted basic controller to obtain $N_b$ fuzzy sets; and determining that the input variable belongs to a membership function $f_{in,(i,C)}(x_i)$ of each fuzzy set and the output variable belongs to a membership function $f_{out,B}(c_{tre})$ of each fuzzy set.

The membership $\mu_{in,(i,C)}$ of the input variable belonging to different fuzzy sets can be calculated in the following mode:

$$\mu_{in,(i,C)} = f_{in,(i,C)}(x_i)$$

wherein $x_i$ is the value of the ith input variable; C is a division fuzzy set; $f_{in,(i,C)}$ is a membership function that the ith input variable belongs to the fuzzy set C; and $\mu_{in,(i,C)}$ is a membership of the calculated ith input variable in the fuzzy set C.

The membership $\mu_{out,B}$ of the output variable belonging to different fuzzy sets can be calculated in the following mode:

$$\mu_{out,B} = f_{out,B}(c_{tre})$$

wherein $c_{tre}$ is the selection trend of the output; B is a division fuzzy set; $f_{out,B}(c_{tre})$ represents a membership function of output $c_{tre}$ in an output fuzzy set B; and $\mu_{out,B}$ is a membership of the calculated selection trend $c_{tre}$ in the fuzzy set B.

The above membership functions $f_{in,(i,C)}$ and $f_{out,B}$ generally comprise but are not limited to the following functions:

(1) Gaussion Membership Function

The Gaussion membership function is determined by two parameters $\sigma$ and $\epsilon$, with the following expression:

$$f(x_{in}, \sigma, \epsilon) = e^{\frac{(x_{in}-\epsilon)^2}{2\sigma^2}}$$

In the formula, $x_{in}$ is a variable to be fuzzified, parameter $\sigma$ is used for adjusting the width of the membership function, parameter E is used for determining the center of a curve, and the calculation result of $f$ is the membership of $x_{in}$.

(2) Trapezoidal Membership Function

The trapezoidal membership function can be determined by four parameters a, b, c, d, with the following expression:

$$f(x_{in}, a, b, c, d) = \begin{cases} 0, & x \le a \\ \dfrac{x_{in}-a}{b-a}, & a \le x \le b \\ 1, & b \le x \le c \\ \dfrac{d-x_{in}}{d-c}, & c \le x \le d \\ 0, & x \ge d \end{cases}$$

In the formula, $x_{in}$ is a variable to be fuzzified, parameters a and d are the left and right vertices of the lower bottom of a trapezoid respectively, and parameters b and c are the left and right vertices of the upper bottom of the trapezoid respectively.

(3) Triangular Membership Function

The triangular membership function is determined by three parameters, with the following expression:

$$f(x_{in}, a, b, c) = \begin{cases} 0, & x \le a \\ \dfrac{x_{in}-a}{b-a}, & a \le x \le b \\ \dfrac{c-x_{in}}{c-b}, & b \le x \le c \\ 0, & x \ge c \end{cases}$$

In the formula, $x_{in}$ is a variable to be fuzzified, parameters a and c are the left and right vertices of a base of a triangle, and parameter b represents the upper vertex of the triangle.

S2.3 Establishing a fuzzy rule table of the fuzzy switching module and designing $N_{rules}$ fuzzy rules.

The fuzzy rules can be explained in if-then format, namely:

If $x_1 \in C_1$, $x_2 \in C_2$, ..., $x_n \in C_n$ then $c_{tre} \in B$ wherein $C_1$ represents a fuzzy set to which the first input variable belongs in the fuzzy rule, C represents a fuzzy set to which the second variable belongs, and so on; and B represents a fuzzy set to which output $c_{tre}$ belongs in the fuzzy rule.

In the fuzzy rules, $(x_1 \in C_1, x_2 \in C_2, ..., x_n \in C_n)$ is a prior condition of the fuzzy rules, and then a prior membership $\mu_{rule,i}$ of the fuzzy rules can be calculated as:

$$\mu_{rule,i} = \prod_{k=1}^{N_{ins}} \mu_{in,(k,C_k)}$$

wherein $\mu_{in,(k,C_k)}$ is a membership of the input variables calculated in S2.2 in the fuzzy set; $N_{ins}$ is the number of input variables in the fuzzy rule; and $\mu_{rule,i}$ is a prior membership of the calculated ith fuzzy rule.

S2.4 Conducting defuzzification for the output of the fuzzy switching module so that a result after defuzzification is the calculated controller selection trend $c_{tre}$ of the fuzzy switching module; conducting defuzzification for output results by a centroid method, with a calculation process as follows:

(1) calculating the prior membership $\mu_{rule,i}$ of each fuzzy rule, namely:

$$\mu_{rule,i} = \prod_{k=1}^{N_{ins}} \mu_{in,(k,C_k)}$$

(2) calculating the controller selection trend $c_{tre}$ by the centroid method:

$$c_{tre} = \frac{\int_0^1 c \cdot \left(\Sigma_{j=1}^{N_{rules}} \mu_{rule,j} \cdot f_{out,B_j}(c)\right) dc}{\int_0^1 c \cdot \left(\Sigma_{i=1}^{N_{rules}} \mu_{rule,i} \cdot f_{out,B_i}(c)\right) dc}$$

wherein $\mu_{rule,i}$ and $\mu_{rule,j}$ are the calculated prior memberships of ith and jth fuzzy rules respectively; $f_{out,B_i}$ and $f_{out,B_j}$ are membership functions of the output fuzzy set B in ith and jth fuzzy rules respectively; $c_{tre}$ is the calculated controller selection trend.

S3 Designing a control signal fusion module. The input of the control signal fusion module comprises the controller selection trend $c_{tre}$ and a basic control signal $u_{base}$ generated by the basic controller, and the output is a control signal $u_{out}$ after fusion. The control signal fusion module calculates the weight $c_{tre}$ of each basic controller according to the input controller selection trend $w_i$, and then conducts weighted fusion for the basic control signal $u_{base}$ according to the calculated weight, to finally obtain an actual control signal $u_{out}$ of the controller.

The design of the control signal fusion module needs to determine the controller fusion weight and the weighted fusion method, comprising the following specific steps:

S3.1 Designing the controller fusion weight; and according to the number $N_c$ of the basic controllers, conducting fuzzy division for the selection trend $c_{tre}$ to obtain a fuzzy set center which can be calculated with the following formula:

$$c_i = \frac{1}{N_c - 1}(\text{rank}_i - 1), \quad \text{rank}_i = 1, 2, \ldots, N_c$$

In the formula, $c_i$ is the ith fuzzy set center; $N_c$ is the number of the basic controllers; $\text{rank}_i$ is a range determined by the ith controller in step S1.3, and the value is an integer from 1 to $N_c$. For example, when $N_c=3$, fuzzy set centers are $c_1=0$, $c_2=0.5$ and $c_3=1$.

The weight $w_i$ corresponding to the ith controller can be calculated according to the following formula:

$$w_i = f_{w,i}(c_{tre})$$

wherein $c_{tre}$ is the input of the fusion module, i.e., the controller selection trend; $f_{w,i}$ is a membership function corresponding to the ith controller, and the membership functions can select the form mentioned in step S2.2; and $w_i$ is the calculated weight corresponding to the ith controller.

S3.2 Conducting weighted fusion for the basic control signal to obtain an actual control signal $u_{out}$ of the basic controller.

The actual control signal $u_{out}$ of the basic controller can be obtained by weighted fusion through the following formula:

$$u_{out} = \frac{\sum_{j=1}^{N_c} w_j \cdot u_{base,j}}{\sum_{i=1}^{N_c} w_i}$$

wherein $u_{base,j}$ represents the basic control signal outputted by the jth basic controller; $w_i$ and $w_j$ represent the weights corresponding to the ith and jth basic controllers respectively; $N_c$ is the number of the basic controllers; and $u_{out}$ is the actual output control quantity of the fused controller, i.e., the output control quantity of the fuzzy switching controller designed by the present invention.

The above provides the main design and calculation process of the aero-engine surge active control system based on fuzzy controller switching designed by the present invention.

The present invention has the beneficial effects: the surge active control method based on fuzzy controller switching designed by the patent overcomes the limitations of the surge active control method based on a single controller, solves the problem that the single controller cannot satisfy multiple disturbance and expands the effective operating ranges of the surge active controllers. The method can adjust the weight of each basic controller adaptively according to the size of the disturbance, so that the compressor better adapts to various external disturbances. Thus, an aero-engine axial flow compressor can work stably in a wider operating range, thereby greatly improving the success rate of surge active control and the stability of the compressor and improving the safety and the reliability of the aero-engine.

DETAILED DESCRIPTION

The present invention is further described below in combination with drawings and embodiments of the present invention.

Figure 1:
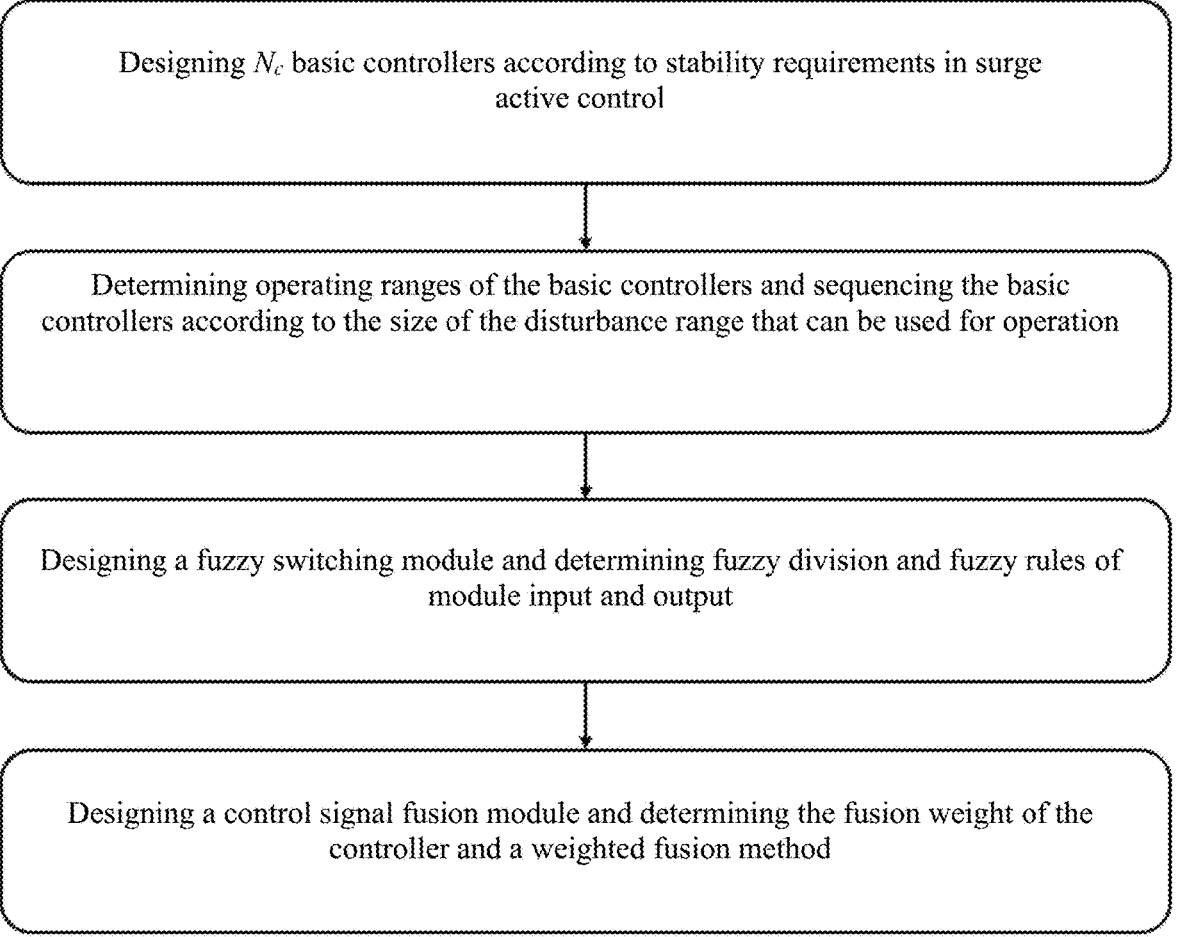
FIG. 1 is a design flow chart of an aero-engine surge active control system based on fuzzy controller switching.

An aero-engine surge active control system based on fuzzy controller switching is provided. The control system mainly comprises three parts: a basic controller design module, a fuzzy switching module and a control signal fusion module. The design flow chart of the aero-engine surge active control system based on fuzzy controller switching is shown in FIG. 1.

Figure 2:
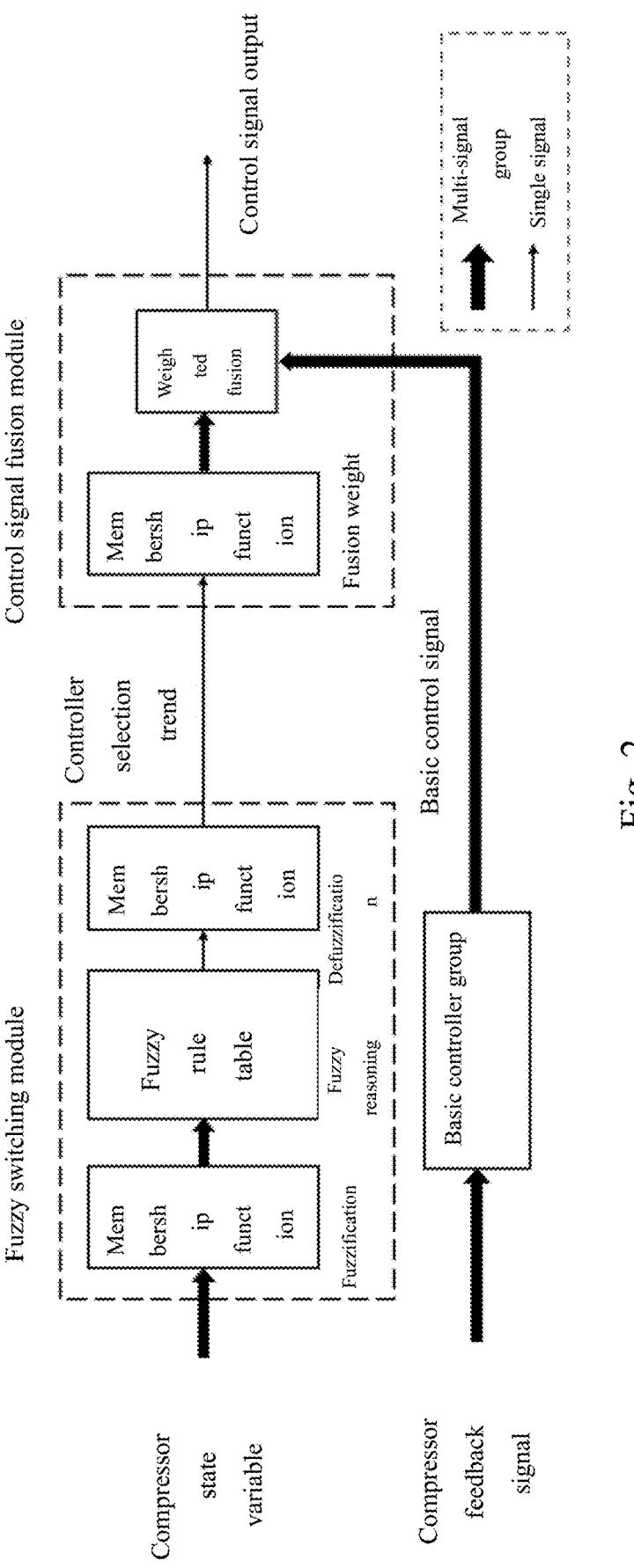
FIG. 2 is a structural schematic diagram of an aero-engine surge active control system based on fuzzy controller switching.

FIG. 2 is a structural schematic diagram of the aero-engine surge active control system based on fuzzy controller switching. It can be seen from the figure that the controller mainly comprises three parts: the fuzzy switching module, the control signal fusion module and basic controllers, wherein the fuzzy switching module further comprises three parts: state variable fuzzification, fuzzy rule reasoning and defuzzification. The fuzzy switching controller generates a controller selection trend $c_{tre}$ through the fuzzy switching module, and the control signal fusion module obtains an actual controller control signal $u_{out}$ through weighted fusion according to the selection trend $c_{tre}$ and a basic control signal $u_{base}$.

Figure 3:
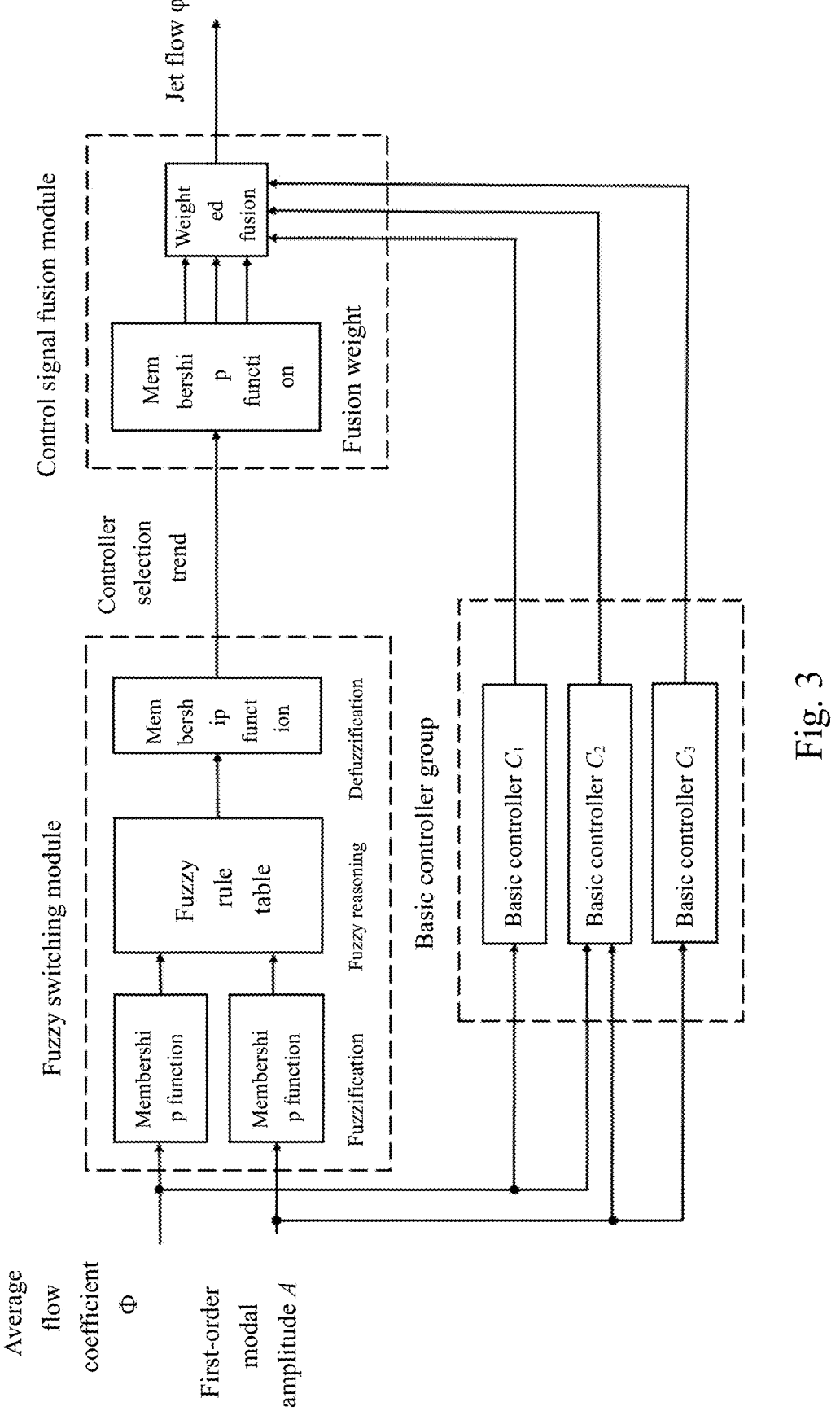
FIG. 3 is a structural diagram of an aero-engine surge active control system based on fuzzy controller switching in an embodiment of the present invention.

FIG. 3 is a structural diagram of the aero-engine surge active control system based on fuzzy controller switching in the present embodiment.

A specific implementation process comprises the following specific steps:

S1 Designing basic controllers: designing 3 basic controllers in combination with traditional Lyapunov stability theory according to stability requirements in surge active control, specifically as follows:

S1.1 Designing 3 basic controllers by a Lyapunov stability theory based modal control method, and using a compressor average flow coefficient $\Phi$ and a disturbance first-order mode A as feedback quantities respectively to determine a relationship between the feedback quantities and a control quantity $u_{base,j}$ required by a compressor: designing $N_c=3$ basic controllers for the basic controllers in FIG. 3 according to design step S1.1; selecting pressure rise $\Psi_j$ generated by a compressor jet valve as the control quantity to obtain the control laws of the basic controllers:

$$u_{base,1}=k_1(\Phi-\Phi_0) \qquad \text{Controller 1:}$$

$$u_{base,2}=k_2A \qquad \text{Controller 2:}$$

$$u_{base,3}=k_3(-\Phi+\Phi_0+A) \qquad \text{Controller 3:}$$

wherein $\Phi$ is the compressor average flow coefficient; A is a first-order modal amplitude; $\Phi_0$ is the average flow coefficient at a balance point of the compressor; $k_1$, $k_2$ and $k_3$ are controller parameters to be determined. According to the Lyapunov stability theory, it can be determined that in the present embodiment, the values of $k_1$, $k_2$ and $k_3$ are as follows: $k_1=-0.1$, $k_2=0.1$ and $k_3=0.1$.

A determining method of the controller parameter is as follows: conducting linearization based on a traditional compressor Moore-Greitzer model, to obtain the controller parameter in combination with the Lyapunov stability theory. The embodiment of the present invention listed herein takes the Moore-Greitzer model of the compressor as a controlled object. The Moore-Greitzer model of the compressor is shown below:

$$\frac{dA}{d\xi} = \frac{3\alpha H}{(1+m\alpha)W}A\left(1-\left(\frac{\Phi}{W}-1\right)^2 - \frac{1}{4W^2}A\right)$$

$$\frac{d\Phi}{d\xi} = \frac{H}{l_c}\left(-\frac{\Psi-\Psi_{C0}}{H} + \frac{3}{2}\left(\frac{\Phi}{W}-1\right)\left(1-\frac{1}{2W^2}A\right) - \frac{1}{2}\left(\frac{\Phi}{W}-1\right)^3 + 1\right)$$

$$\frac{d\Psi}{d\xi} = \frac{1}{4B^2l_c}(\Phi(\xi)-\Phi_T(\xi))$$

In the equations, $A(\xi)$ is a first-order modal amplitude, $\Phi(\xi)$ is the compressor average flow coefficient, $\Psi(\xi)$ is the average pressure rise coefficient of the compressor and $\Phi_T(\xi)$ is the average flow coefficient of a downstream valve of the compressor; in the equations, other parameters are inherent parameters of the compressor, and select the following values here:

$\Psi_{C0}=0.30$, H=0.14, W=0.25, $l_c=8.0$, $\alpha=1/3.5$ and m=1.75.

S1.2 Determining the operating ranges of the 3 basic controllers: when the operating state of the compressor is within the operating ranges of the basic controllers, the basic controllers can ensure the stable operation of the compressor through tip jet, and the operating ranges of the basic controllers can be expressed by the size of the disturbance to the compressor. The performance characteristics of the above three basic controllers are shown in Table 2.

TABLE 2

| Performance Characteristics of Basic Controllers | |
|---|---|
| Controllers | Performance Characteristics |
| Controller 1 (average flow coefficient $\Phi$) | Applicable to small disturbance conditions with small flow coefficient change and slow development, with less jet quantity |
| Controller 2 (first-order modal amplitude A) | Applicable to large disturbance state, with larger jet quantity |
| Controller 3 (comprehensive feedback $(\Phi, A)$) | Applicable to moderate disturbance state, with less and smooth fluctuation of controlled quantity and moderate jet quantity |

S1.3 Sequencing the basic controllers according to the size of the disturbance range that can be used for operation, based on the operating ranges of the 3 basic controllers, that is, with the increase of the disturbance to the compressor, the controllers in the operating ranges are converted in this order, wherein the rank of the ith basic controller is recorded as $rank_i$, and $rank_i$ is an integer from 1 to 3. It can be seen from Table 2 that the 3 basic controllers have respective operating ranges. With the increase of the disturbance to the compressor, the controllers in the operating ranges are converted from the controller 1 to the controller 3, and then converted to the controller 2. Therefore, the range of the basic controllers can be recorded as follows:

Controller 1: $rank_1=1$

Controller 2: $rank_2=3$

Controller 3: $rank_3=2$

S2 Designing the fuzzy switching module.

Figure 4:
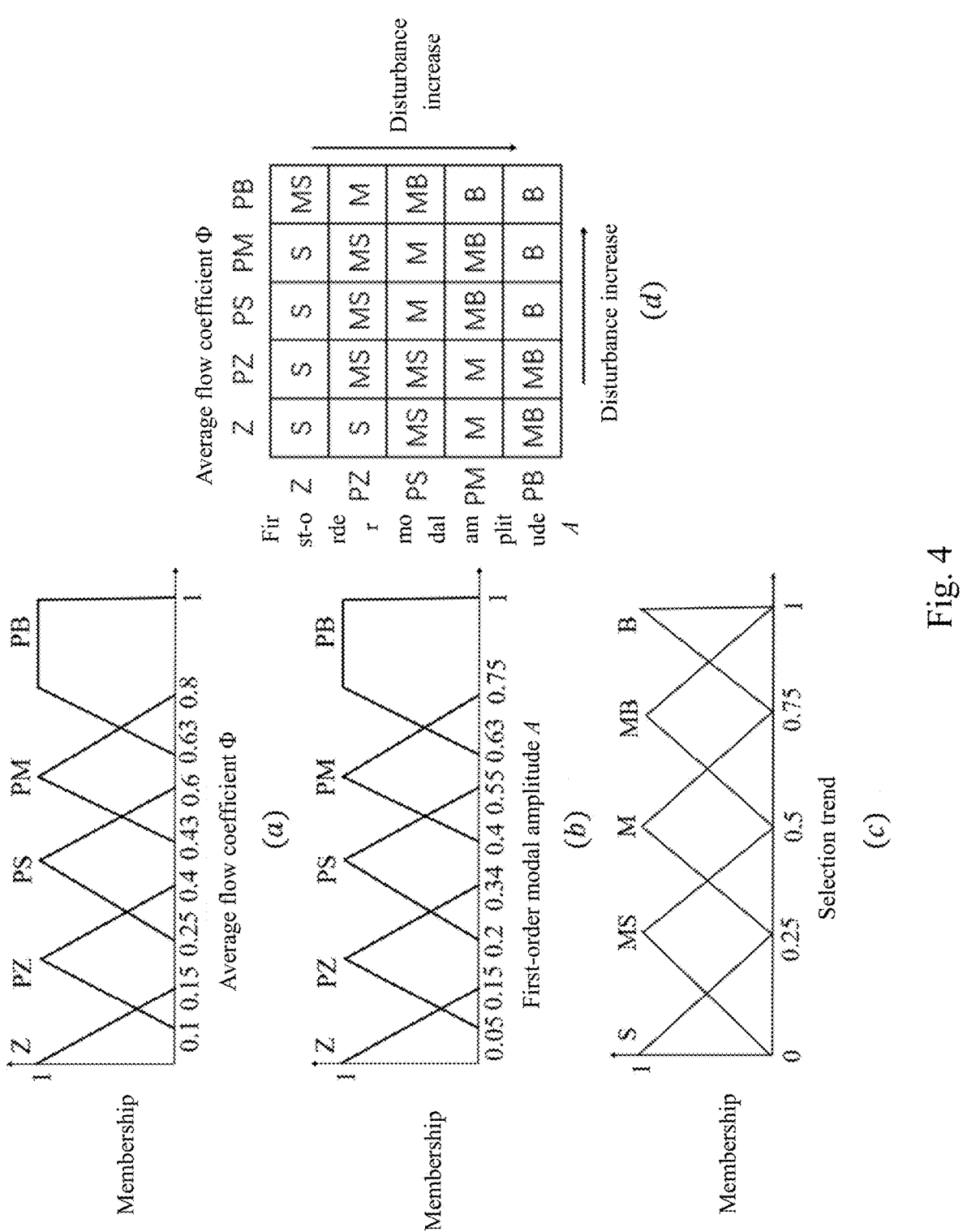
FIG. 4 is a schematic diagram of fuzzy sets and fuzzy rules of input and output of a fuzzy switching module; wherein FIG.(a) is fuzzy set division of an average flow coefficient $\Phi$, FIG.(b) is fuzzy set division of a first-order modal amplitude A, FIG.(c) is fuzzy set division of output selection trend $c_{tre}$ of a fuzzy switching module, and FIG. (d) shows fuzzy switching rules used by the fuzzy switching module.

FIG. 4 is a schematic diagram of fuzzy sets and fuzzy rules of input and output of the fuzzy switching module, which reflects the design process of the fuzzy switching module, wherein FIG.(a) is fuzzy set division of an average flow coefficient $\Phi$, FIG.(b) is fuzzy set division of a first-order modal amplitude A, FIG.(c) is fuzzy set division of output controller selection trend $c_{tre}$ of the fuzzy switching module, and FIG.(d) shows fuzzy switching rules used by the fuzzy switching module.

The fuzzy switching module obtains a selection trend x of the basic controllers by traditional fuzzy reasoning according to a state variable $c_{tre}$ of the compressor. The state variable x of the compressor comprises but is not limited to the compressor average flow c and average pressure rise $\Psi$. The selection trend $c_{tre}$ of the basic controllers is a parameter within a range of 0-1, and is used for representing a weight of a basic controller.

S2.1 Determining the average flow $\Phi$ and the first-order mode A which can represent the operating state of the compressor, as the input of the fuzzy switching module.

S2.2 Conducting fuzzy division for the state variable x inputted by the fuzzy switching module, as shown in FIG. 4(a):

Fuzzy division is conducted for the average flow coefficient $\Phi$ and the first-order modal amplitude A to obtain $N_a=5$ fuzzy sets. A reminder membership function and a triangular membership function are used in membership functions. The parameters of the selected membership functions are shown in Table 3 and Table 4 respectively (in order to unify the format, the triangular membership function is regarded as a trapezoidal membership function with two endpoints on upper bottom overlapping). Fuzzy set division of the average flow coefficient Φ and the first-order modal amplitude A is shown in FIG. (a) and FIG. (b) respectively.

TABLE 3

Membership Function Parameters of Fuzzy Sets of Average Flow Coefficients

| Fuzzy sets | a | b | c | d |
|---|---|---|---|---|
| Z | 0 | 0 | 0 | 0.15 |
| PZ | 0.1 | 0.25 | 0.25 | 0.4 |
| PS | 0.25 | 0.4 | 0.4 | 0.43 |
| PM | 0.43 | 0.6 | 0.6 | 0.63 |
| PB | 0.63 | 0.8 | 1 | 1 |

TABLE 4

Membership Function Parameters of Fuzzy Sets of First-Order Modal Amplitude

| Fuzzy sets | a | b | c | d |
|---|---|---|---|---|
| Z | 0 | 0 | 0 | 0.15 |
| PZ | 0.05 | 0.18 | 0.18 | 0.34 |
| PS | 0.2 | 0.35 | 0.35 | 0.55 |
| PM | 0.4 | 0.55 | 0.55 | 0.75 |
| PB | 0.63 | 0.75 | 1 | 1 |

Fuzzy division is conducted for the selection trend $c_{tre}$ of the output of the fuzzy switching module to obtain $N_b$=5 fuzzy sets. The triangular membership function is used in the membership function. The parameters of the selected membership function are shown in Table 5. Fuzzy set division of the selection trend $c_{tre}$ is shown in FIG.(c).

TABLE 5

Membership Function Parameters of Fuzzy Sets of Selection trend

| Fuzzy sets | a | b | c |
|---|---|---|---|
| S | 0 | 0 | 0.25 |
| MS | 0 | 0.25 | 0.5 |
| M | 0.25 | 0.5 | 0.75 |
| MB | 0.5 | 0.75 | 1 |
| B | 0.75 | 1 | 1 |

S2.3 Establishing a fuzzy rule table, as shown in FIG. 4(d):

According to the performance characteristics of the basic controllers, it can be seen that as the disturbance to the compressor is continuously increased, the controllers are gradually transitioned from average flow coefficient feedback to comprehensive feedback, and then gradually transitioned to first-order modal amplitude feedback according to the operating ranges of the basic controllers. Meanwhile, with the gradual increase of the selection trend $c_{tre}$, the used basic controllers are gradually transitioned from the average flow coefficient feedback to the comprehensive feedback, and then gradually transitioned to the first-order modal amplitude feedback. Thus, the design of the fuzzy rules can follow the principle that the greater the compressor disturbance is, the greater the selection trend $c_{tre}$ is, that is, with the continuous increase of the average flow coefficient Φ and the first-order modal amplitude A, the selection trend $c_{tre}$ is gradually transitioned from the fuzzy set S to the fuzzy set B. The fuzzy rule table corresponding to the above principle is shown in FIG. 4(d).

S2.4 Conducting defuzzification for the output of the fuzzy switching module to obtain the selection trend $c_{tre}$. The process of defuzzification is illustrated by a specific example here.

The average flow coefficient Φ=0.275 and the first-order mode A=0.387 are taken as an example:

(1) Calculating the Prior Membership $\mu_{rule,i}$ of Each Fuzzy Rule

The following fuzzy rule is taken as an example, i.e.

if Φ∈PZ, A∈PS then $c_{tre}$∈MS

The rule of the prior membership can be calculated as $$\mu_{rule,1} = \prod_{k=1}^{2} \mu_{in,(k,C_k)} = \mu_{in,(1PZ)} \times \mu_{in,(2PS)}$$

$$= f_{in,(1PZ)}(\Phi) \times f_{in,(2PS)}(A) = 0.833 \times 0.815$$

$$= 0.679$$

(2) Calculating the Controller Selection Trend $c_{tre}$ by the Centroid Method

After the prior membership $\mu_{rule,i}$ of each fuzzy rule is determined, the controller selection trend $c_{tre}$ can be calculated according to the defuzzification method by the centroid method in S2.4.

$$c_{tre} = \frac{\int_0^1 c \cdot \left(\Sigma_{j=1}^{25} \mu_{rule,j} \cdot f_{out,B_j}(c)\right) dc}{\int_0^1 c \cdot \left(\Sigma_{i=1}^{25} \mu_{rule,i} \cdot f_{out,B_i}(c)\right) dc} = 0.286$$

Figure 5:
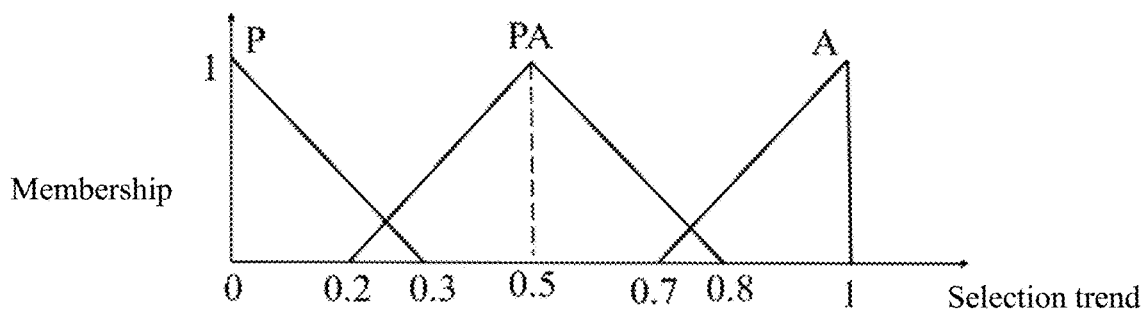
FIG. 5 is a schematic diagram of fuzzy set division of a control signal fusion module.

S3 Designing a control signal fusion module. FIG. 5 is a schematic diagram of fuzzy set division of the control signal fusion module.

S3.1 Designing a controller fusion weight. In FIG. 5, the fuzzy set P represents the weight of the average flow coefficient feedback, the fuzzy set PA represents the weight of the comprehensive feedback, and the fuzzy set A represents the weight of the first-order modal amplitude feedback, all of which use the triangular membership functions. In the present embodiment, three basic controllers are used, i.e., $N_c$=3. According to step S3.1, fuzzy set centers can be determined as $c_1$=0, $c_2$=0.5 and $c_3$=1 respectively. Membership function parameters of the fuzzy sets of the control signal fusion module are shown in Table 6.

TABLE 6

Membership Function Parameters of Fuzzy Sets of Control Signal Fusion Module

| Fuzzy sets | a | b | c |
|---|---|---|---|
| P | 0 | 0 | 0.3 |
| PA | 0.2 | 0.5 | 0.8 |
| A | 0.7 | 1 | 1 |

Figure 6:
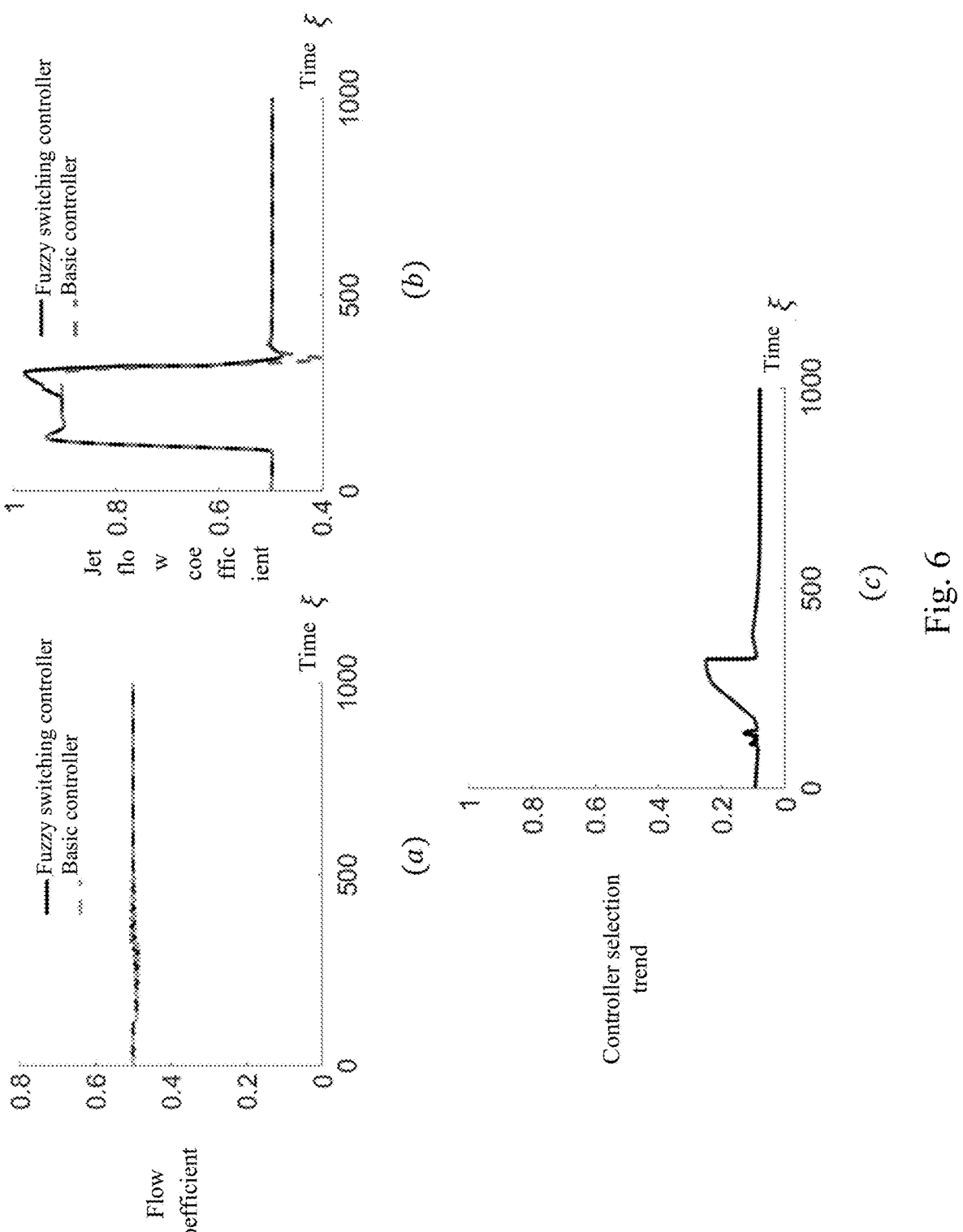
FIG. 6 shows a surge active control process under small disturbance, wherein FIG.(a) shows a change process of a local compressor flow coefficient when a fuzzy switching controller and basic controllers proposed in the present invention implement control in the same operating range; FIG. (b) shows jet flow coefficients generated by the fuzzy switching controller and the basic controllers; FIG.(c) shows a switching signal generated by the fuzzy switching module at this moment.
Figure 7:
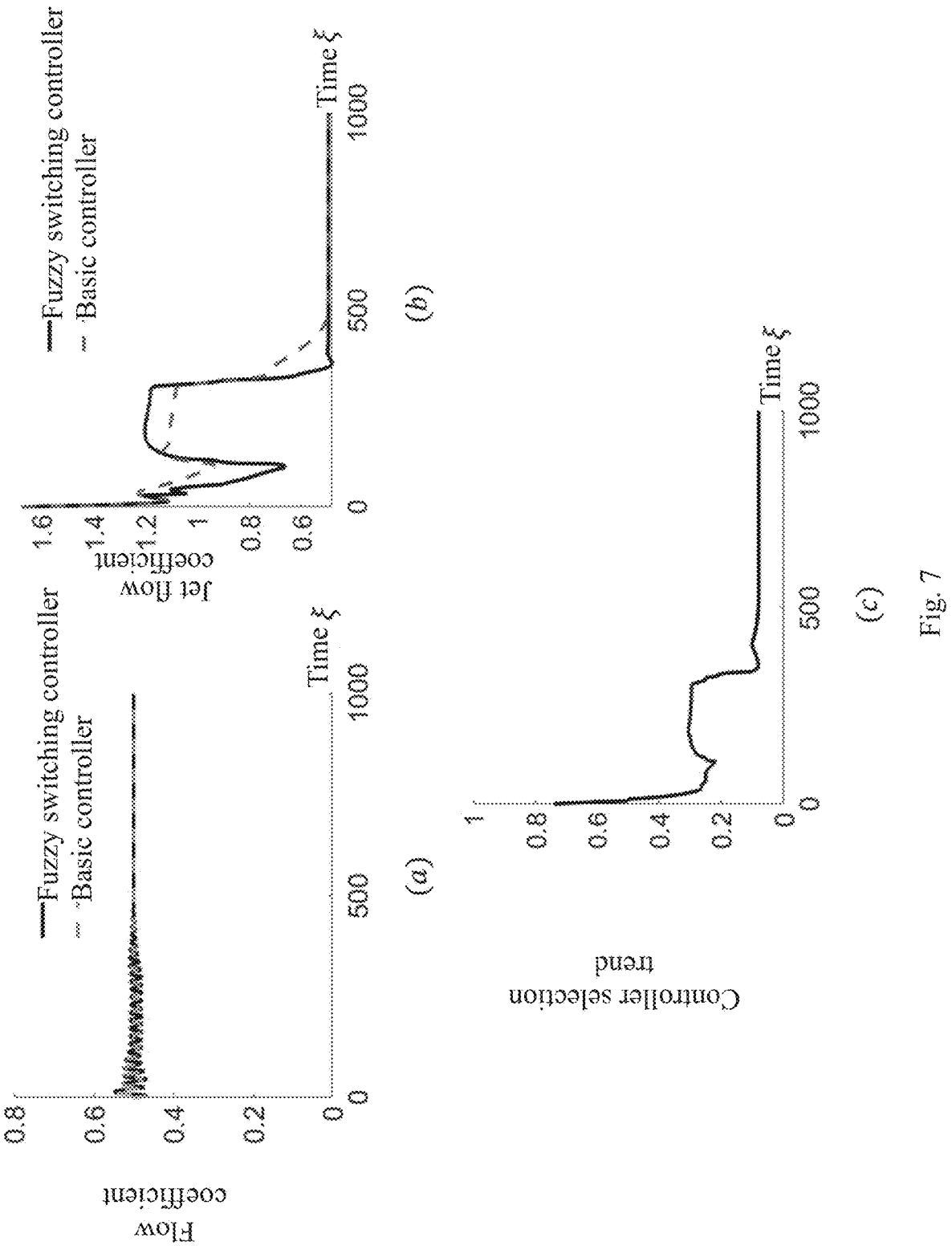
FIG. 7 shows a surge active control process under moderate disturbance, wherein the meanings of FIG.(a), FIG.(b) and FIG.(c) are the same as those described in FIG. 6.
Figure 8:
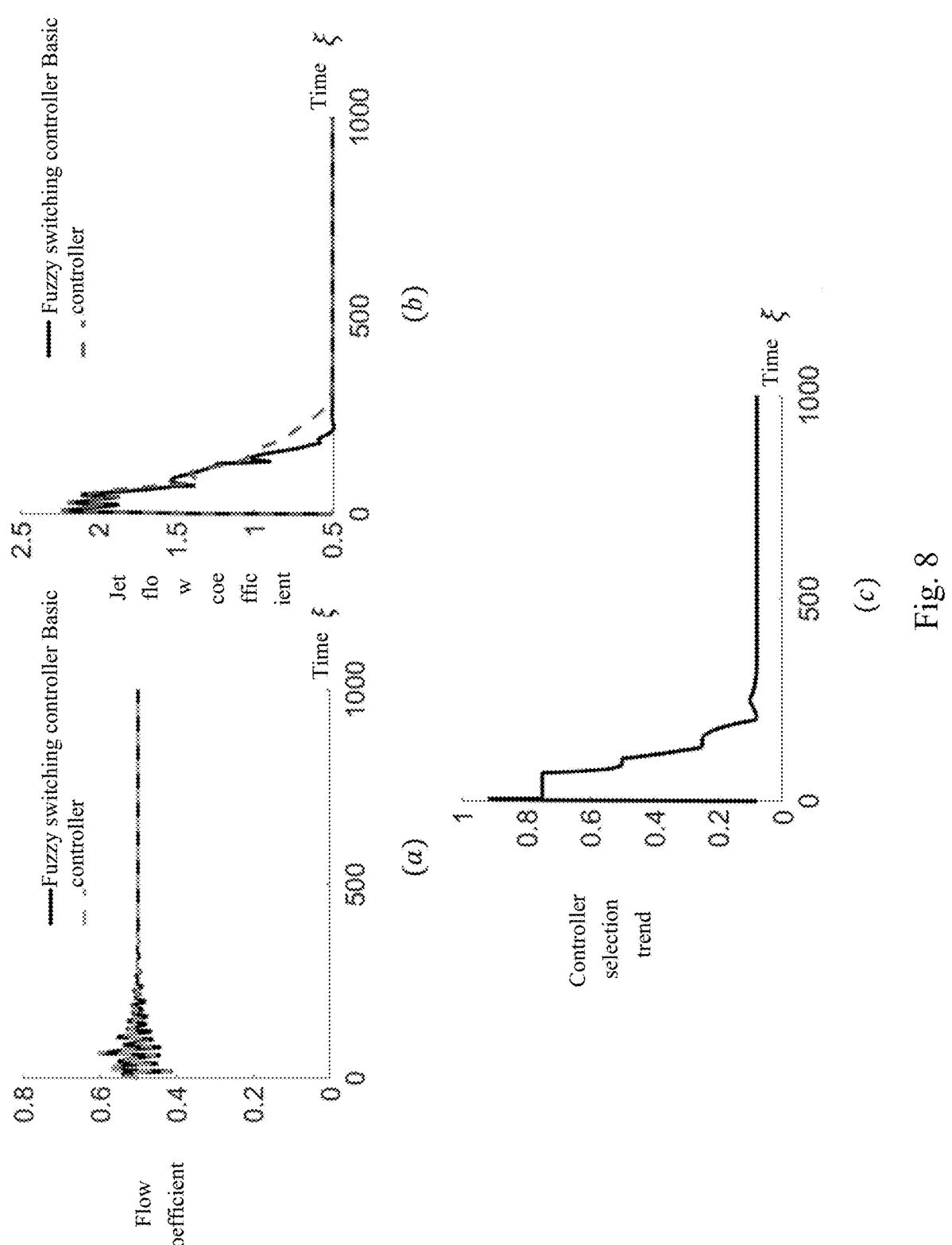
FIG. 8 shows a surge active control process under large disturbance, wherein the meanings of FIG.(a), FIG.(b) and FIG.(c) are the same as those described in the previous figure.

S3.2 Conducting weighted fusion for the basic control signal, and calculating weights corresponding to each basic controller according to the fuzzy membership of the control signal fusion module labeled with 6 in S3.1 to obtain the actual output control quantity of the controller after fusion, i.e., the output control quantity $u_{out}$ of the fuzzy switching controller designed by the present invention. Calculation results are shown in FIG. 6, FIG. 7 and FIG. 8.

The process of weighted fusion of the control signal is further illustrated by an example here:

The selection trend $c_{tre}$=0.286 of the controller is calculated in step S2.4 of the detailed description. According to the method in S3.2, the weights corresponding to the basic controllers can be obtained as follows:

$$w_1=f_{w,1}(c_{tre})=0.0457$$

$$w_2=f_{w,2}(c_{tre})=0$$

$$w_3=f_{w,3}(c_{tre})=0.288$$

Then, the outputs of the basic controllers are respectively $$u_{base,1}=k_1(\Phi-\Phi_0)=0.737$$

$$u_{base,2}=k_2A=1.285$$

$$u_{base,3}=k_3(-\Phi+\Phi_0+A)=1.369$$

The controller output after fusion is $$u_{out} =$$

$$\frac{\sum_{j=1}^{3} w_j \cdot u_{base,j}}{\sum_{i=1}^{3} w_i} = \frac{0.0457 \times 0.737 + 0 \times 1.285 + 0.288 \times 1.369}{0.0457 + 0 + 0.288} = 1.283$$

The simulation calculation results of this implementation case are shown in FIG. 6, FIG. 7 and FIG. 8: FIG. 6 shows a surge active control process under small disturbance. This disturbance is generated by smaller initial disturbance, wherein FIG. (a) shows a change process of a compressor flow coefficient when a fuzzy switching controller and basic controllers proposed in the present invention implement control; FIG. (b) shows jet flow coefficients generated by the fuzzy switching controller and the basic controllers; FIG.(c) shows a selection trend $c_{tre}$ generated by the fuzzy switching module at this moment. It can be seen from the figure that under the action of the fuzzy switching controller, the control effect is consistent or even slightly better than that of the basic controllers, and the jet quantity of the jet valve can also be basically consistent. Meanwhile, the selection trend $c_{tre}$ generated by the fuzzy switching module is basically kept at a low level, that is, the controller which uses the average flow coefficient $\Phi$ as the feedback quantity. This is consistent with the performance characteristics and the operating ranges of the basic controllers in the design process.

FIG. 7 shows a surge active control process under moderate disturbance. This disturbance is generated by larger initial disturbance, wherein the meanings of FIG.(a), FIG.(b) and FIG.(c) are the same as those described in FIG. 6. The fuzzy switching controller can achieve the surge active control effect consistent with the basic controllers under moderate disturbance. However, the jet quantity generated by the jet valve used by the fuzzy switching controller is significantly less than that of the basic controllers, which can reflect that the fuzzy switching controller can achieve a more optimized or even optimal control strategy under the required performance indexes. The selection trend $c_{tre}$ of the controller indicates that at this moment, the controller is gradually transitioned from comprehensive feedback to average flow coefficient feedback, which also conforms to the performance characteristics and the operating ranges of the basic controllers in the design process.

FIG. 8 shows a surge active control process under large disturbance. This disturbance is generated by placing distortion plates in front of the compressor, wherein the meanings of FIG.(a), FIG.(b) and FIG.(c) are the same as those described in the previous figure. The distortion plates can significantly change the inlet flow field of the compressor, which has great influence on the stable operation of the compressor. Under this condition, the fuzzy switching controller can achieve the same or even better performance than the basic controllers in the process of surge active control. Meanwhile, the jet quantity generated by the jet valve is also significantly reduced after comparison, so that the control process has less influence on the operating performance of the engine. In this state, the change process of the controller selection trend $c_{tre}$ among the basic controllers can be clearly observed. The selection trend is decreased gradually with the size of the disturbance to the compressor, which indicates that the controller is gradually transitioned from the first-order modal amplitude feedback to the comprehensive feedback and then to the average flow coefficient feedback at this moment. It can also be seen from the above process that the surge active control method based on fuzzy switching can control the stable operation of the compressor under the conditions of large disturbance and multiple surge causes, and the reliability and the adaptability of the controllers are significantly improved.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. An aero-engine surge active control system based on fuzzy controller switching, the control system mainly comprising three parts: a basic controller design module, a fuzzy switching module and a control signal fusion module, wherein the design process of each part comprises the following steps:

S1 designing $N_c$ basic controllers according to stability requirements in surge active control, wherein the basic controllers are used for generating a basic control signal $u_{base}$ of a fuzzy switching controller designed by the present invention, and an implementation process is as follows:

S1.1 designing $N_c$ basic controllers by a Lyapunov stability theory based modal control method, with $N_c$ not less than 2; in each basic controller, using a compressor average flow coefficient $\Phi$ and a disturbance first-order mode A as feedback quantities respectively to determine a relationship between the feedback quantities and a control quantity $u_c$ required by a compressor, i.e.:

$$u_{base,1}=k_1(\Phi-\Phi_0)$$

$$u_{base,2}=k_2A$$

$$u_{base,N_c}=k_{N_c}(-\Phi+\Phi_0+A)$$

in the formulas, $k_1$, $k_2$, . . . , $k_{N_c}$ are controller parameters to be determined; $u_{base,j}$ represents a basic control signal outputted by an jth basic controller, and $\Phi_0$ is the average flow coefficient of the compressor during steady-state operation;

S1.2 determining the operating ranges of the $N_c$ basic controllers: when the operating state of the compressor is within the operating ranges of the basic controllers, the basic controllers can ensure the stable operation of the compressor through tip jet, and the operating ranges of the basic controllers are expressed by the size of the disturbance to the compressor; in the design process of the basic controllers, selecting different compressor parameter variables as feedback variables of the basic controllers, and designing the basic controllers operated in the range of small disturbance and large disturbance respectively to obtain the basic controllers with different operating ranges, wherein the compressor parameter variables comprise average flow $\Phi$ and first-order mode A;

S1.3 sequencing the basic controllers according to the size of the disturbance range that can be used for operation, based on the operating ranges of the $N_c$ basic controllers, that is, with the increase of the disturbance to the compressor, the controllers in the operating ranges are converted in this order, wherein the rank of the ith basic controller is recorded as $rank_i$, and $rank_i$ is an integer from 1 to $N_c$;

S2 designing the fuzzy switching module: the fuzzy switching module obtains a selection trend $c_{tre}$ of the basic controllers by fuzzy reasoning according to a state variable x of the compressor, for representing the weight of a basic controller; the design of the fuzzy switching module needs to determine a state variable x of module input, fuzzy division of module input and output, fuzzy rules used in fuzzy reasoning, and a defuzzification method; a specific design process is as follows:

S2.1 determining the state variable x which can represent the operating state of the compressor, as the input of the fuzzy switching module;

S2.2 conducting fuzzy division for the state variable x of the input of the fuzzy switching module, and obtaining $N_a$ fuzzy sets in each variable division; conducting fuzzy division for the selection trend $c_{tre}$ of the outputted basic controller to obtain $N_b$ fuzzy sets; determining that the input variable belongs to a membership function $f_{in,(i,C)}(x_i)$ of each fuzzy set and the output variable belongs to a membership function $f_{out,B}(c_{tre})$ of each fuzzy set;

the membership $\mu_{in,(i,C)}$ of the input variable belonging to different fuzzy sets can be calculated in the following mode:

$$\mu_{in,(i,C)} = f_{in,(i,C)}(x_i)$$

wherein $x_i$ is the value of the ith input variable; C is a division fuzzy set; $f_{in,(i,C)}$ is a membership function that the ith input variable belongs to the fuzzy set C; $\mu_{in,(i,C)}$ is a membership of the calculated ith input variable in the fuzzy set C;

the membership $\mu_{out,B}$ of the output variable belonging to different fuzzy sets can be calculated in the following mode:

$$\mu_{out,B} = f_{out,B}(c_{tre})$$

wherein $c_{tre}$ is the selection trend of the output; B is a division fuzzy set; $f_{out,B}(c_{tre})$ represents a membership function of output $c_{tre}$ in an output fuzzy set B; $\mu_{out,B}$ is a membership of the calculated selection trend $c_{tre}$ in the fuzzy set B;

S2.3 establishing a fuzzy rule table of the fuzzy switching module and designing $N_{rules}$ fuzzy rules;

the fuzzy rules can be explained in if-then format, namely:

If $x_1 \in C_1$, $x_2 \in C_2$, . . . , $x_n \in C_n$ then $c_{tre} \in B$ wherein $C_1$ represents a fuzzy set to which the first input variable belongs in the fuzzy rule, C represents a fuzzy set to which the second variable belongs, and so on; B represents a fuzzy set to which output $c_{tre}$ belongs in the fuzzy rule;

in the fuzzy rules, $(x_1 \in C_1, x_2 \in C_2, . . . , x_n \in C_n)$ is a prior condition of the fuzzy rules, and then a prior membership $\mu_{rule,i}$ of the fuzzy rules can be calculated as:

$$\mu_{rule,i} = \prod_{k=1}^{N_{ins}} \mu_{in,(k,C_k)}$$

wherein $\mu_{in,(k,C_k)}$ is a membership of the input variables calculated in S2.2 in the fuzzy set; $N_{ins}$ is the number of input variables in the fuzzy rule; $\mu_{rule,i}$ is a prior membership of the calculated ith fuzzy rule;

S2.4 conducting defuzzification for the output of the fuzzy switching module so that a result after defuzzification is the calculated controller selection trend $c_{tre}$ of the fuzzy switching module; conducting defuzzification for output results by a centroid method, with a calculation process as follows:

(1) calculating the prior membership $\mu_{rule,i}$ of each fuzzy rule, namely:

$$\mu_{rule,i} = \prod_{k=1}^{N_{ins}} \mu_{in,(k,C_k)}$$

(2) calculating the controller selection trend $c_{tre}$ by the centroid method:

$$c_{tre} = \frac{\int_0^1 c \cdot \left( \Sigma_{j=1}^{25} \mu_{rule,j} \cdot f_{out,B_j}(c) \right) dc}{\int_0^1 c \cdot \left( \Sigma_{i=1}^{25} \mu_{rule,i} \cdot f_{out,B_i}(c) \right) dc}$$

wherein $\mu_{rule,i}$ and $\mu_{rule,j}$ are the calculated prior memberships of ith and jth fuzzy rules respectively; $f_{out,B_i}$ and $f_{out,B_j}$ are membership functions of the output fuzzy set B in ith and jth fuzzy rules respectively; $c_{tre}$ is the calculated controller selection trend;

S3 designing a control signal fusion module; the input of the control signal fusion module comprises the controller selection trend $c_{tre}$ and a basic control signal $u_{base}$ generated by the basic controller, and the output is a control signal $u_{out}$ after fusion; the control signal fusion module calculates the weight $w_i$ of each basic controller according to the input controller selection trend $c_{tre}$, and then conducts weighted fusion for the basic control signal $u_{base}$ according to the calculated weight, to finally obtain an actual control signal $u_{out}$ of the controller;

the design of the control signal fusion module needs to determine the controller fusion weight and the weighted fusion method, comprising the following specific steps:

S3.1 designing the controller fusion weight; according to the number $N_c$ of the basic controllers, conducting fuzzy division for the selection trend $c_{tre}$ to obtain a fuzzy set center, with the following formula for calculation:

$$c_i = \frac{1}{N_c - 1}(\text{rank}_i - 1), \quad \text{rank}_i = 1, 2, \dots, N_c$$

in the formula, $c_i$ is the ith fuzzy set center; $N_c$ is the number of the basic controllers; $\text{rank}_i$ is a range determined by the ith controller in step S1.3, and the value is an integer from 1 to $N_c$; for example, when $N_c=3$, fuzzy set centers are $c_i=0$, $c_2=0.5$ and $c_3=1$;

the weight $w_i$ corresponding to the ith controller is calculated according to the following formula:

$$w_i = f_{w,i}(c_{tre})$$

wherein $c_{tre}$ is the input of the fusion module, i.e., the controller selection trend; $f_{w,i}$ is a membership function corresponding to the ith controller, and the membership functions can select the form mentioned in step S2.2; $w_i$ is the calculated weight corresponding to the ith controller;

S3.2 conducting weighted fusion for the basic control signal to obtain an actual control signal $u_{out}$ of the basic controller;

the actual control signal $u_{out}$ of the basic controller can be obtained by weighted fusion through the following formula:

$$u_{out} = \frac{\sum_{j=1}^{N_c} w_j \cdot u_{base,j}}{\sum_{k=1}^{N_c} w_i}$$

wherein $u_{base,j}$ represents the basic control signal outputted by the jth basic controller; $w_i$ and $w_j$ represent the weights corresponding to the ith and jth basic controllers respectively; $N_c$ is the number of the basic controllers; $u_{out}$ is the actual output control quantity of the fused controller, i.e., the output control quantity of the fuzzy switching controller designed by the present invention.

2. The aero-engine surge active control system based on fuzzy controller switching according to claim 1, wherein in step S1.1, a determining method of the controller parameter is as follows: conducting linearization based on a traditional compressor Moore-Greitzer model, to obtain the controller parameter in combination with the Lyapunov stability theory.

3. The aero-engine surge active control system based on fuzzy controller switching according to claim 1, wherein in step S2, the compressor state variable x comprises average flow and average pressure rise of the compressor.

4. The aero-engine surge active control system based on fuzzy controller switching according to claim 1, wherein in step S2, the selection trend $c_{tre}$ of the basic controller is within a range of 0-1.

* * * * *